(12) United States Patent
Pike et al.

(10) Patent No.: US 6,861,943 B2
(45) Date of Patent: Mar. 1, 2005

(54) SYSTEM AND METHOD FOR NETWORK ELEMENT EQUIPMENT STATUS MONITORING

(75) Inventors: Dion Pike, Dunrobin (CA); Richard Grieve, Ottawa (CA)

(73) Assignee: Alcatel Canada Inc., Kanata (CA)

(*) Notice: Subject to any disclaimer, the term of this patent is extended or adjusted under 35 U.S.C. 154(b) by 243 days.

(21) Appl. No.: 10/015,574

(22) Filed: Dec. 17, 2001

(65) Prior Publication Data

US 2003/0058080 A1 Mar. 27, 2003

(30) Foreign Application Priority Data

Sep. 27, 2001 (CA) .............................................. 2358034

(51) Int. Cl.[7] ........................ G05B 23/02; H03K 17/00; H04L 12/26; H04L 12/28
(52) U.S. Cl. ...................................................... 340/3.9
(58) Field of Search ........................ 370/3.9, 241, 252, 370/254; 340/3.9; 700/108

(56) References Cited

U.S. PATENT DOCUMENTS

| | | | |
|---|---|---|---|
| 4,667,187 A | 5/1987 | Volk et al. | |
| 5,124,616 A | 6/1992 | Wrzesinski | |
| 6,072,858 A | * 6/2000 | Bellin | 379/33 |
| 6,574,082 B2 | * 6/2003 | Vitek | 361/78 |
| 6,661,655 B2 | * 12/2003 | Yin | 361/687 |

* cited by examiner

Primary Examiner—Michael Horabik
Assistant Examiner—Kimberly Hamilton
(74) Attorney, Agent, or Firm—McCarthy Tétrault LLP

(57) ABSTRACT

A signalling system providing communications between a controller and a remote unit in a network element is provided. The signalling system comprises a first communication module associated with the controller, a second communication module associated with the remote unit and a communication link for the first and second communication modules. The first communication module generates a command signal and a downstream monitoring signal for the remote unit. The second communication module receives the command signal and the downstream monitoring signal and generates the status signal and the upstream monitoring signal. The communication link carries the signals. The first communication module monitors for receipt of the upstream monitoring signal and the status signal and determines status of the communication link and the remote unit utilizing results of monitoring for the receipt of the upstream monitoring signal, the status signal and the command signal.

18 Claims, 9 Drawing Sheets

SYSTEM AND METHOD FOR NETWORK ELEMENT EQUIPMENT STATUS MONITORING

FIELD OF THE INVENTION

The invention relates to a system and method of providing monitoring of equipment in a communication switch.

BACKGROUND OF INVENTION

In a communication switch, functionality is provided through a set of cards operating together to provide communication switching. Frequently, cards are grouped together in logical groups of shelves. Often for a shelf, or group of shelves, intelligent fan units are provided to maintain a safe operating ambient temperature for the components in the shelf. The fan units are controlled by remote controlling elements connected via links. However, prior art systems do not provide robust feedback to the controlling element of the fan unit regarding the operation of the fan. In the signalling connection from the fan to the controlling element, a failure in that link may cause a failure of the fan unit to go undetected by the controlling element. A similar problem exists with remotely controlled power modules in a switch.

There is a need for a system and method providing switching modularity that improves upon the prior art systems.

SUMMARY OF INVENTION

In a first aspect, a signalling system providing communications between a controller and a remote unit in a network element is provided. The signalling system comprises a first communication module associated with the controller, a second communication module associated with the remote unit and a communication link associated with the first and second communication modules. The first communication module generates a command signal and a downstream monitoring signal for the remote unit receives a status signal and an upstream monitoring signal associated with the remote unit. The second communication module receives the command signal and the downstream monitoring signal and generates the status signal and the upstream monitoring signal. The communication link carries the command signal, the downstream monitoring signal the status signal and the upstream monitoring signal. The controller monitors for receipt of the upstream monitoring signal and the status signal bu the first communication module and determines status of at least the communication link and the remote unit from any signals received by the first communication module.

The signalling system may have the downstream monitoring signal carried with the command signal and the upstream monitoring signal carried with the status signal. Further, the command signal may be a DC signal and the downstream monitoring signal may be a pulse superimposed on the command signal and the status signal may be another DC signal and the upstream monitoring signal may be another pulse signal superimposed on the status signal, which is discernible from the upstream monitoring signal by the first communication module. Further still, the upstream monitoring signal may be generated by the second communication module from an XOR function of a value of an internal state of the remote module and a value of the pulse signal of the downstream monitoring signal. Yet further still, the remote unit may be a fan unit.

The controller of the signalling system may provide a TDM stream comprising a bitstream relating to the command signal and the downstream monitoring signal. Prior to transmission over the communication link, the TDM stream may be converted to a DC signal and the downstream monitoring signal may be converted to a pulse signal superimposed on the command signal. The status signal may be another DC signal provided to the communication link and the upstream monitoring signal may be a pulse signal superimposed on the status signal. After receiving the status signal and the upstream monitoring signal over the communication link, the controller converts the status signal and the upstream monitoring signal to another TDM stream which is analyzed by the controller to determine the status of at least the communication link and the remote unit.

The upstream monitoring signal may be generated by the second communication module from an XOR function of an internal state of the remote unit and the downstream monitoring signal.

The remote unit may be a power module.

In another aspect, a signalling system providing communications between a controller and a remote unit is provided. The signalling system comprises a first communication module associated with the controller. The first communication module generates a command signal as a DC signal and a downstream monitoring signal superimposed on the command signal and receives a status signal and an upstream monitoring signal associated with the remote unit. The signalling system further comprises a second communication module associated with the remote unit. The second communication module receives the command signal and the downstream monitoring signal from the first communication module and generates the status signal and the upstream monitoring signal as a pulse for the controller utilizing the command signal, the downstream monitoring signal and a status of the remote unit. A communication link is associated with the first communication module and the second communication module. The communication link carries the command signal, the downstream monitoring signal, the status signal and the upstream monitoring signal. The controller monitors for receipt of the upstream monitoring signal and the status signal by the first communication module and determines a status of at least the communication link and the remote unit by analyzing any signals received by the first communication module.

The upstream monitoring signal may be generated by the second communication module from an XOR function of a value of an internal state signal related to the status signal and a second value of a pulse signal related to the downstream monitoring signal. Further, the remote unit may be a fan unit and the first and second communication modules may be in a network element.

The controller of the signalling system may comprises a TDM module to generate a TDM stream containing a bitstream relating to the command signal and the downstream monitoring signal. At the first communication module, the TDM stream may be converted to the command signal and the downstream monitoring signal and the status signal and the upstream monitoring signal may be converted to signals in another TDM stream and provided to the TDM module. Further, the upstream monitoring signal may be generated by the second communication module from an XOR function of a value of an internal state signal related to the status signal and a second value of a pulse signal related to the downstream monitoring signal. Still further, the remote unit may be a power module.

In yet another aspect, a method for a controller remotely connected to a remote unit via a communication link to monitor status of the communication link and the remote unit is provided. The method comprise, at the controller, generating a command signal as a DC signal and a downstream monitoring signal superimposed on the command signal for the remote unit, and transmitting the command signal and the downstream signal to the remote unit via the communication link. The method further comprises, at the remote unit, monitoring for receipt of the command signal and the downstream monitoring signal. Upon receipt of the command signal and the downstream monitoring signal generating a status signal and an upstream monitoring signal as a pulse superimposed on the status signal based on the command signal, the downstream monitoring signal and the status of the remote unit, and transmitting the status signal and the upstream monitoring signal to the controller via the communication link. The method further comprises, at the controller, monitoring for receipt of the upstream monitoring signal and status signal, and determining a statu of at least the communication link and the remote unit from any signals received from the remote unit.

The upstream monitoring signal of the method may be generated by the second communication module from an XOR function of a value of an internal state signal related to the status signal and a second value of a pulse signal related to the downstream monitoring signal. Further, the remote unit may be a fan unit. Still further, at the controller, the command signal and the downstream monitoring signal may be generated after receiving comparable command signals embedded in a TDM stream. After the status signal and the upstream monitoring signal are received over the communication link, TDM stream may be generated which contains a bitstream containing information relating to the status signal and the upstream monitoring signal, and the status of at least the communication link and the remote unit from any signals received from the remote unit may be determined from analyzing the another TDM stream.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

as illustrated in FIG. 7.

DETAILED DESCRIPTION OF THE EMBODIMENTS

Figure 1:
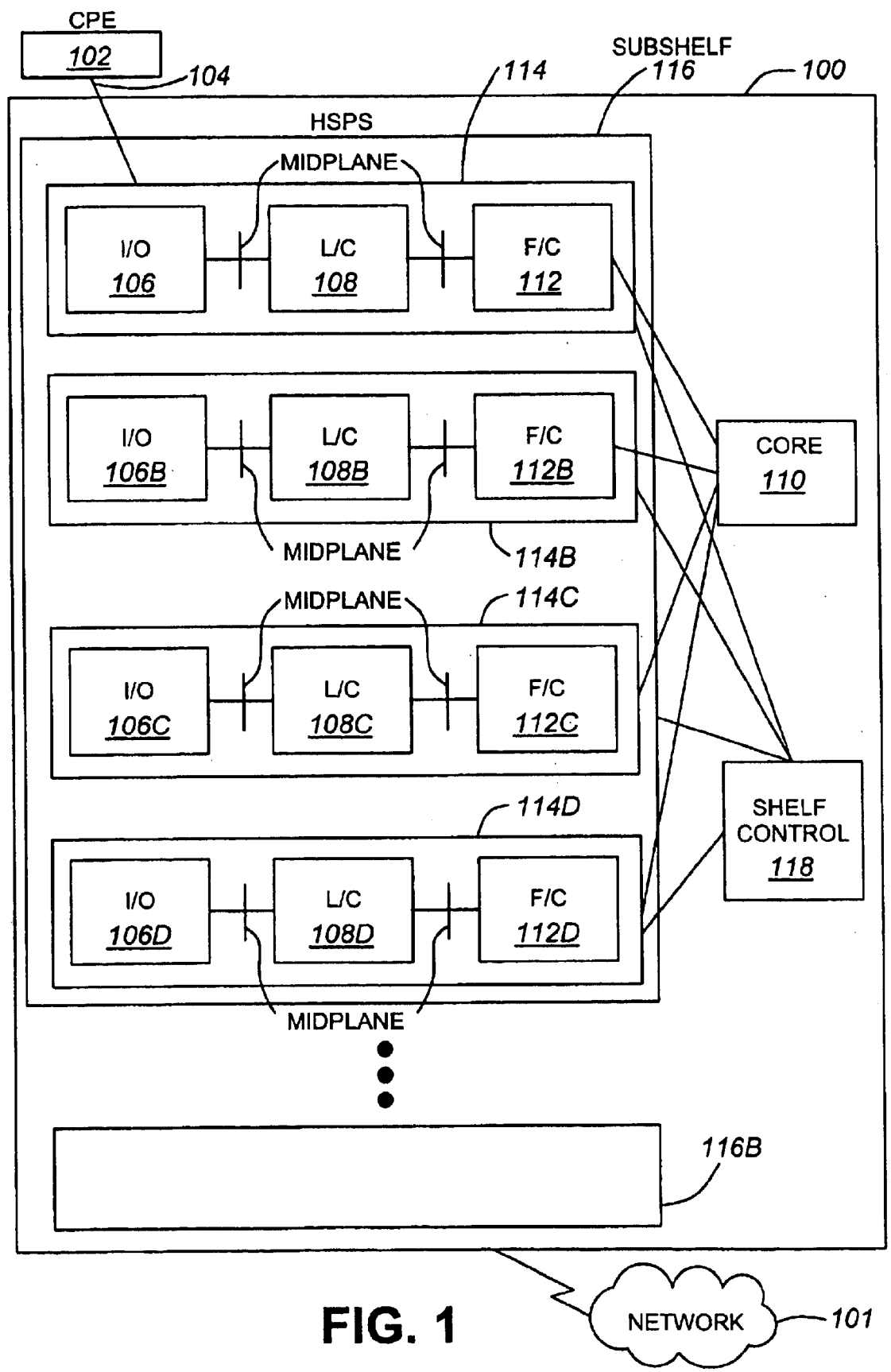
FIG. 1 is a block diagram of components of a switch illustrating an embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Figure 2:
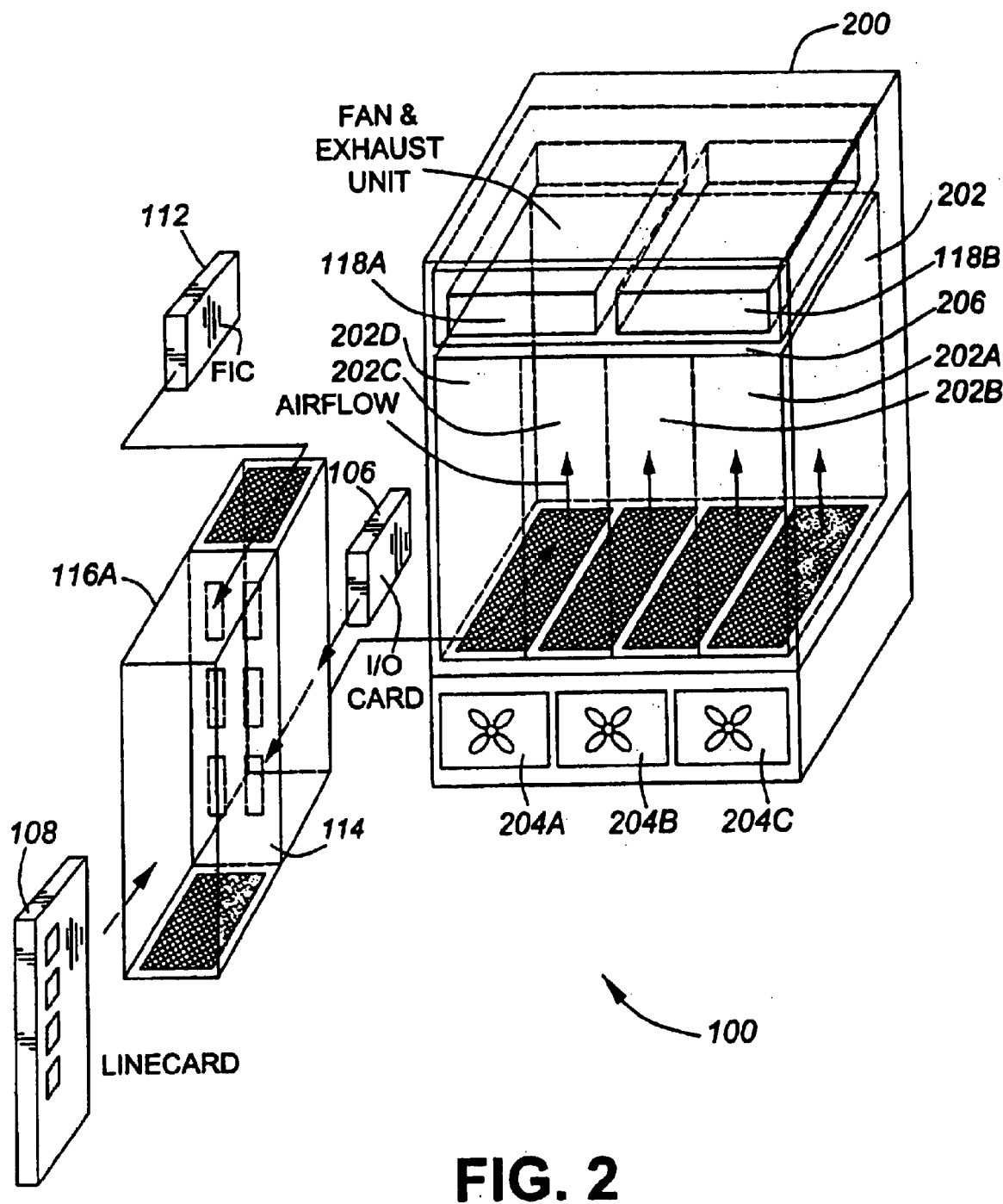
FIG. 2 is a block diagram of a front view of the switch of FIG. 1.

Referring to FIGS. 1 and 2, switch 100 is a multi-protocol backbone system, which can process both of ATM cells and IP traffic through its same switching fabric. Switch 100 is connected to a communication network 101, allowing a customer premise device (CPE) 102 on one end of the network to communicate to a device at another end of the network. In the present embodiment, switch 100 allows scaling of the switching fabric capacity from 50 Gbps to 450 Gbps in increments of 14.4 Gbps simply by the insertion of additional switching shelves into switch 100.

It will be appreciated that terms such as "routing switch", "communication switch", "communication device", "switch", "network element" and other terms known in the art may be used to describe switch 100. Further, while the embodiment is described for switch 100, it will appreciated that the system and method described herein may be adapted to any communication system.

In switch 100, CPE 102 is connected via a link 104 to switch 100 to I/O card 106. I/O card 106 provides the main interface for CPE 102 to switch 100 for its datastream. But for converting the datastream into a format for switch 100, I/O card 106 does not process the datastream. I/O card 106 sends the datastream from CPE 102 to line card 108. Line card 108 provides OC-192 functionality, ATM provisioning and ATM cell processing between core 110 of switch 100 and CPE 102. Each line card 108 is also connected to a fabric interface card (FIC) 112 which converts the datastream from the line card to an optical signal and sends the datastream to core 110. In core 110, the datastream is routed to an appropriate egress path, leaves core 110 and is provided to an egress path through an egress line card. For this example, the egress path may be through line card 108B. A terminal (not shown) is connected to routing switch 100 and runs controlling software, which allows an operator to modify, and control the operation of, switch 100. The overall operation and components of switch 100 are well known in the art, but for aspects of the embodiment described herein.

The line card 108, FIC 112 and I/O cards 106 are grouped on a midplane (described later) into a slot 114. Slots 114A, 114B, 114C and 114D may be grouped into a High Speed Peripheral Shelf (HSPS), represented as peripheral shelf 116. As a shelf, HSPS 116 may be provided with a redundant shelf 116B having a complementary set of slots 114 and cards 106, 108 and 112 to HSPS 116. Alternatively other shelves may be provided in switch 100 having different functions, for example switch control functions.

Shelf controller 118 is provided in switch 100 to arbitrate commands to each of the shelves 116.

Referring to FIG. 2, physically in the prior art, a shelf, like the HSPS 116, was embodied in a single midplane, spanning the width of the cabinet of switch 100. However, the embodiment provides the improvement of a plurality of subshelves one of each for peripheral shelf 116 and a system to allow cards on each subshelf to communicate with each other. In each subshelf, there is a midplane which provides a physical substrate onto which local cards may be mounted.

In particular, switch 100 comprises chassis 200 (shown in partial view) which has opening 202 therein. Within opening 202, one of several subshelf modules, e.g., subshelf module 116A, may be inserted into one of four subslots 202A, 202B, 2024C or 202D of opening 202. Fan units 204A, 204B and 204C, located in a compartment beneath opening 202 provide forced-air cooling to modules 116. Exhaust and intake section 206 located above opening 202 provides the flow-through and exhaust section for forced-air forced from fan units 204A . . . 204C through subshelves 116. Shelf controller circuits 118A and 118B provide the control systems for each of subshelves 116A . . . 116D and fan units 204A, 204B and 204C.

Figure 3:
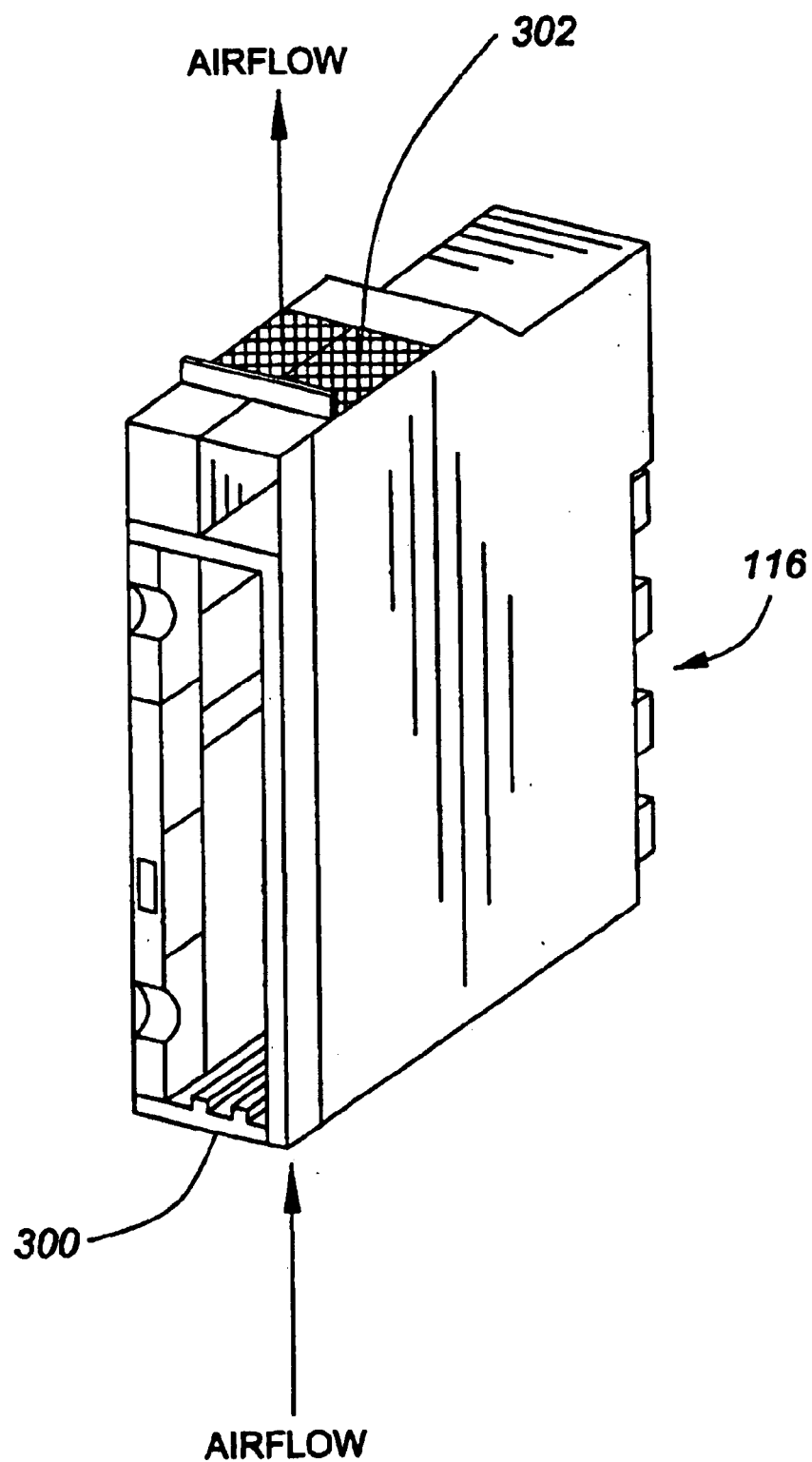
FIG. 3 is a front perspective view of a subshelf arrangement associated with the switch of FIG. 2.

Referring to FIG. 3, additional physical aspects of subshelf 116A are illustrated. Generally, subshelf 116A is an elongated rectangular form. On the bottom of subshelf 116A, there is an airflow opening allowing air to flow through. Along top of subshelf 116A at top of subshelf 116A, grid 302 provides flow-through ventilation for air to cool components contained within subshelf 116A. Power for subshelf 116A is provided externally; however, redundant power conditioning in a power module (not shown) is provided to condition and regulate the power signals provided to the components in subshelf 116A.

It will be appreciated that it is necessary to maintain a temperature-controlled operating environment for components within subshelf 116A. The embodiment provides a system wherein shelf controller 118 can control both power module 120 and fan unit 204A.

Following is a description of the control by shelf controller 118 of fan unit 204A.

Figure 4:
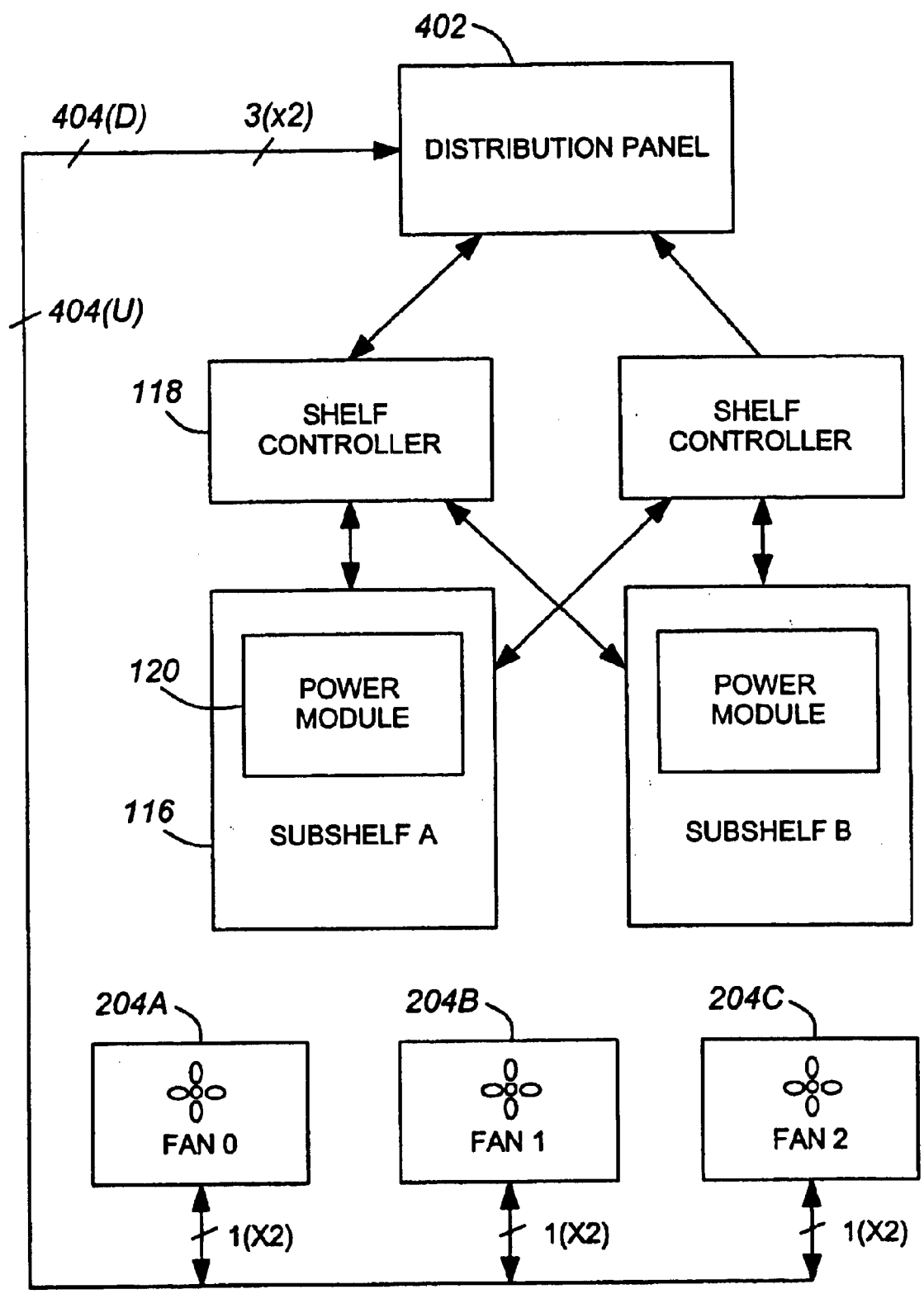
FIG. 4 is a block diagram of components of the switch of FIG. 1.

Referring to FIG. 4, shelf controller 118A is shown in tandem with shelf controller 118B. In the embodiment, controllers 118A and 118B operate in a redundant manner to each other. For the purposes of control of the fan unit 204 and power module 120, the control is described in turns of a generic, single controller 118. It will be understood that either or both controllers 118A and 118B may incorporate the embodiment.

Shelf controller 118 is connected to distribution panel 402. Signals generated by shelf controller 118 which are destined for fan unit 204A, 204B or 204C are provided as a DC signal to distribution panel 402. Distribution panel 402 is a printed circuit board having connections and tracks which provide interconnections from inputs from shelf controller 118 to inputs for control signals for each of the fan units 204A, 204B and 204C. Essentially, distribution panel 402 is a connection point for the shelf controller 118. Shelf controller 118 has a downstream communication link to each of fans 204A, 204B and 204C through distribution panel 402 per link 404D (suffix D for "downstream"). Similarly, each of fans 204A, 204B and 204C has an upstream communication link to shelf controller 118 via distribution panel 402 per link 404U (suffix U for "upstream"). It will be appreciated that any failure in the communication loop 404D through 404U for any given fan unit 204 to shelf controller 118 will cause either:

(i) a failure of shelf controller 118 to provide a command to the respective fan unit (in the event of a failure of the downstream link 404D); or (ii) the failure of the shelf controller to receive an accurate status report of the fan due to a failure in the upstream link 404U. It will be appreciated that the shelf controller further needs to be able to know that it is receiving an accurate status report. For example, if a failure on the link causes the status report to be "stuck" as reporting a good condition, regardless of its actual condition, the controller would normally not know that the status report is inaccurate. The embodiment provides a solution for this problem.

It will be appreciated that operation of the fan unit 204 is critical. In the event of a failure of a neighbouring fan unit, the shelf controller 118 may require the target fan unit 204 to increase its airflow speed to increase the airflow through subshelf 116 to maintain a target operating temperature for the components contained therein.

The embodiment provides an encoded signalling system which enables the shelf controller 118 to "ping" fan unit 204 and receive and analyze a signal contained in a subsequent message received from the fan unit 204. The subsequent message will indicate the integrity of various components in the communication link and the fan unit 204, including the entire downstream and upstream communication link, isolation transceivers related to the link and some circuitry associated with the link. The subsequent message will also provide a status reporting indicating the current state of the fan unit 204.

Accordingly, it can be seen that the embodiment comprises two separate and distinct components:

a) a communication system where a controller (here, shelf controller 118) can communicate action requests to a remote unit (here, fan unit 204A). The communications for the communication system are provided via DC signal carried over a communication link between the controller and the remote units. The controller provides a DC signal to command the remote unit to perform certain tasks, and the remote unit provides a DC signal to the controller to indicate the operating status of the module; and b) a monitoring system which checks the integrity of connections and components of parts of the controller, the remote unit and the communication system.

Each is described in turn, although some features of one system are superimposed on features of the other.

Figure 5:
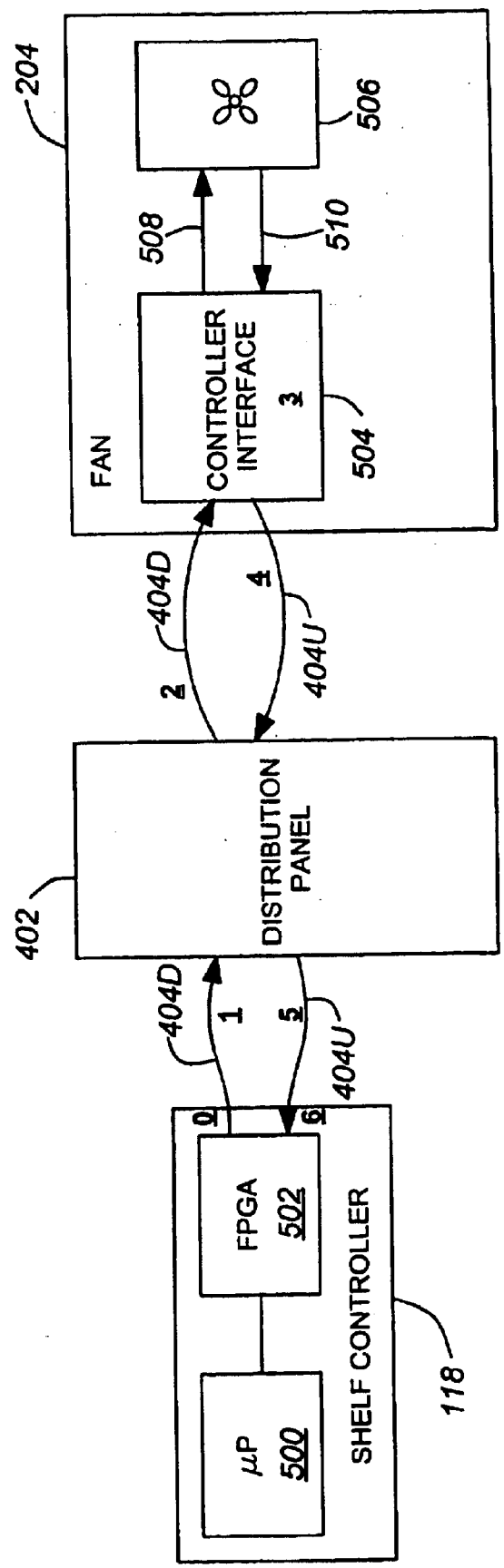
FIG. 5 is a block diagram illustrating the control of a fan unit by a shelf controller of the switch of FIG. 1.

Referring to FIG. 5, further detail on the signalling method for controlling a fan unit 204 is shown through the following example. Therein, within shelf controller 118, microprocessor 500 and FPGA 502 are presently in the condition where they need to request that fan unit 204 to increase its speed. Accordingly, at step 0 the software operating on microprocessor 500 sets an appropriate register in FPGA 502 causing FPGA 502 to initiate the generation of an appropriate DC pulse signal containing a coded message destined for fan unit 204 to increase its speed. The DC pulse signal is transmitted over downstream link 404D to distribution panel 402. The transmission of the DC pulse signal to the distribution panel 402 is shown at step 1. When distribution panel 402 receives the DC pulse signal from shelf controller 118, the electrical cross connections in panel 402 forward the DC pulse signal to the appropriate fan unit 204 along downstream link 404D. This is shown at step 2.

At step 3, fan unit 204 receives the DC pulse signal at controller interface module 504. Controller interface module 504 sends a signal to command fan circuit 506 to increase the fan speed via link 508. Fan circuit provides a speed indication signal to controller interface module 504 on link 510. Controller interface module 504 monitors the status of fan circuit 506 via signals provided by fan circuit 506 on link 510. Controller interface module 504 reports the status of fan circuit 506 to shelf controller 118. In normal operation, fan circuit 506 will cause its fan to increase its speed as a result of the command. As the fan eventually increases its speed, the new speed status is reported to shelf controller 118. However, shelf controller 118 is not necessarily awaiting an acknowledgement to its request. It will be appreciated that shelf controller 118 may generate different reactions to different status reports, depending on the current condition and current requirements of the shelf controller. The algorithms executing these reactions may be implemented in firmware in the switch.

In step 4, the response reply is sent along upstream link 404U to distribution panel 402. The wiring of distribution panel 402 causes the response which is sent along upstream link 404U to be automatically sent to shelf controller 118 through the upstream link 404U. This is shown at step 5. At step 6, shelf controller 118 receives the response and compares the response against the original message sent by shelf controller 118. Depending on the type of status signal provided by fan unit 204, shelf controller 118 will be able to determine if: (i) the link is valid; (ii) the link is invalid; and (iii) the status of the fan unit 204A.

Figure 6:
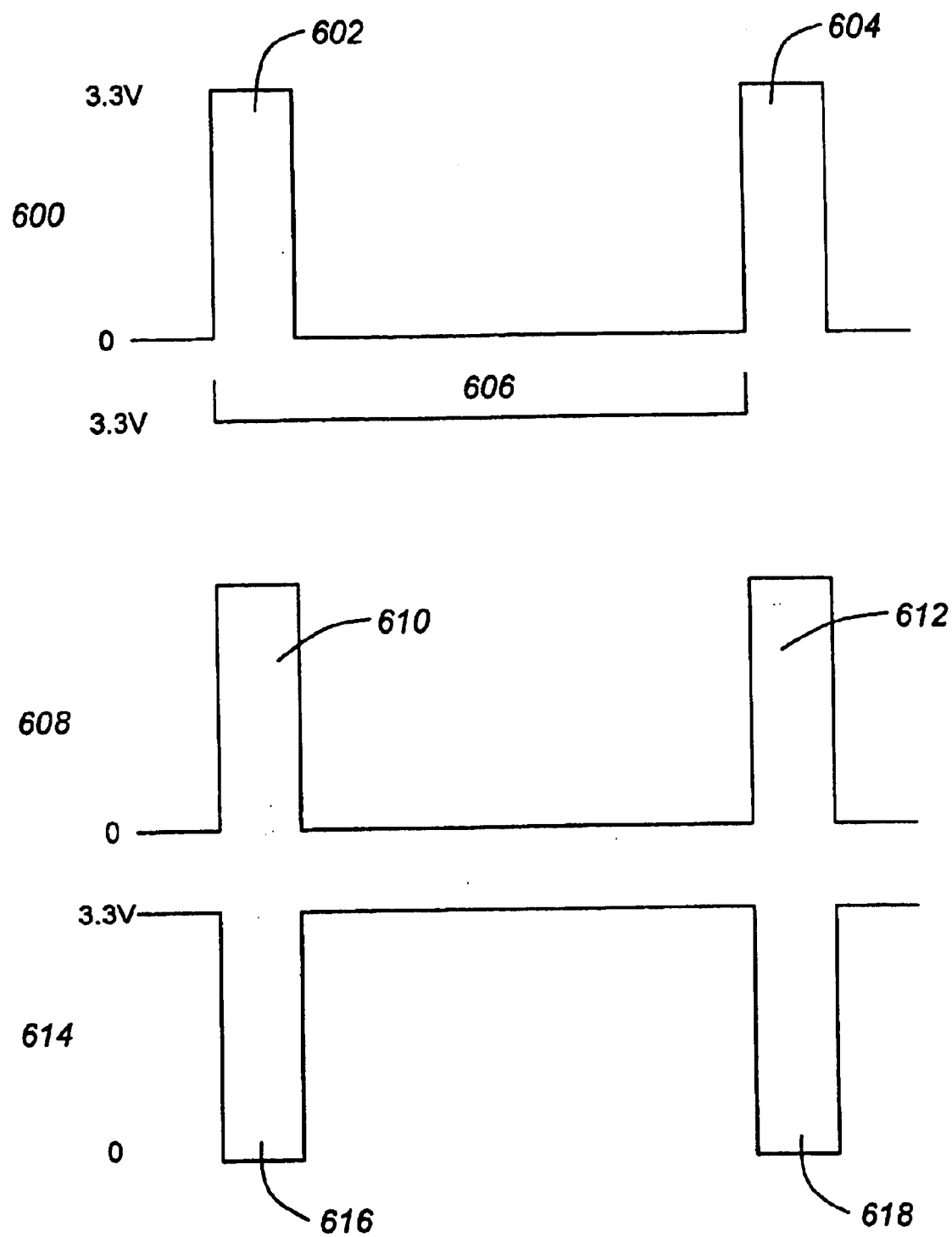
FIG. 6 is a diagram of signals sent by the shelf controller and generated by the fan unit as illustrated in FIG. 5.

Further detail on the signalling component of the request message sent by shelf controller 118 and the upstream message generated by fan unit 204 is provided in FIG. 6. Therein, signal 600 shows an exemplary DC signal generated by shelf controller 118. The DC signal has a value with steps between zero and 3.3 volts in one step. The "pure" DC signal is the implementation of the command communication system of the embodiment. Pulses may be imposed on top of the DC signal. The presence of the pulses in the DC signal is the implementation of the monitoring system of the embodiment.

When shelf controller 118 requires that the fan unit 204A go to maximum speed, for example, FPGA 502 generates a DC signal which is sent on downstream link 404D to fan unit 204A. Here, the initiation signal to request that the fan go to maximum speed is a low, i.e. 0 volt, DC signal.

The current speed status of the fan unit 204A is reflected in the DC value of the signal 608 provided by fan unit 204A to shelf controller 118 via link 404U. FPGA 502 receives and interprets the value of the signal 608 according to the latest request sent by FPGA 502 to fan unit 204A.

Accordingly, the generation and transmission of the downstream DC signal 600 and the upstream DC signal 608 on link 404(D,U) by the controller 118 and fan unit 204A comprises the command communication system of the embodiment.

Concurrently, for the monitoring system, the embodiment superimposes two distinct pulses 602 and 604 separated by time T 606 onto the DC signal 600. The pulses are generated and inserted onto the DC signal by FPGA 502. Accordingly, the pulses are sent via downstream link 404D to fan unit 204A with DC signal 600. Upon receipt of pulses 602 and 604 by fan unit 204A, fan unit 204A superimposes on the upstream DC signal 608 the same pulse information related to pulses 602 and 604. However, in order to distinguish the pulses from the value of the upstream DC signal in signal 608, fan unit 204A produces a pulse train that is the XOR value of the internal state of the upstream DC signal in signal 608 and the value of the received pulses 602 and 604. Accordingly, if the upstream DC signal is low, per signal 608, then the superimposed upstream pulses are "high", per pulses 610 and 612. However, if the upstream DC signal in high, per signal 614, then the superimposed upstream pulses are "low", per pulses 616 and 618. For the monitoring system, shelf controller 118 receives the DC signal and its superimposed pulses.

When shelf controller 118 receives DC signal 608 or 614, it will extract the information contained in the signal. FPGA 502 detects and analyzes the pulses from the upstream signal. In order to facilitate analysis of the pulses, FPGA 502 must decode the received signal. First, in order to recognize and remove the pulse train from the incoming signal, FPGA 502 maintains a "Ping Status" register. If the pulse train is not detected in the incoming signal, it sets the "Ping Status" register to indicate a problem with the communication link.

However, the upstream DC signal must still be analyzed for the communication system of the embodiment. Accordingly, the pulse train is then filtered out of the received DC signal (608 or 614) to eliminate any effect of the pulse to actual status reported to the microprocessor 500. Subsequently, FPGA 502 must decode the filtered received DC signal to report the status of fan unit 204A to microprocessor 500. To decode the DC signal, FPGA utilizes the following equation related to the input and output the signals described above:

(incoming status of fan unit 204A)=(actual internal module status) XOR (logic level driven on the pulses)

Accordingly, FPGA 502 performs an inverse XOR to determine the (actual internal module status), utilizing the known received (incoming status) and (logic level driven on the pulses).

The following table A illustrates the relationships between the input signals, the pulses and the interpolated actual internal module status:

TABLE A

| FPGA 502 output | Alarm condition on fan tray | DC Signal received at FPGA 502 | Behavior of bicolour status LED on fan tray | Interrupt to MPC8260. |
|---|---|---|---|---|
| Inactive (logic low) | no alarm | Logic low | Green | No interrupt |
| Active (logic high) | no alarm | Logic high | Red | No interrupt |
| Inactive (logic low) | alarm detected | Logic high | Red | Micro interrupted |
| Active (logic high) | alarm detected | Logic low | Red | Micro interrupted |

The "FPGA 502 output" column indicates what signals the FPGA generates, i.e. the "logic level driven on the pulses". An "inactive" value in the first column indicates that the LED on the fan tray is not driven red. The "DC Signal received at FPGA 502" indicates the logic level received by the FPGA 502, i.e. the "incoming status" (after filtering the pulse train). Accordingly, utilizing known values for the "logic level . . . " and "incoming status", FPGA 502 can decode the actual status on the fan tray, as shown in the second column entitled "Alarm condition on fan tray". The second column represents the "actual internal module status". The status determined in the second column is reported by FPGA 502 to microprocessor 500 via a readable register, and also a maskable interrupt, per the last column.

For the embodiment, it will be appreciated that the status signal of the fan unit provided by the fan unit has a logical relationship with the command sent, i.e. if the status signal indicates a failure, the value of the status signal can be compared against the original command.

It will be appreciated that other signalling schemes may be used in other embodiments. It will further be appreciated that many types of DC pulses may be used to encode requests and interpret responses, including PWM pulses.

A similar communication system and monitoring system are provided for shelf controller 118 and the power modules 120 contained within subshelves 116. However, as the power module 120 is contained within the subshelf 116, it is not operating on a DC value akin to the DC signals provided to the shelf unit 204. Following is a description of the additional TDM signalling that is required to communicate and evaluate the link associated with power module 120 when shelf controller 118 communicates therewith.

Figure 7:
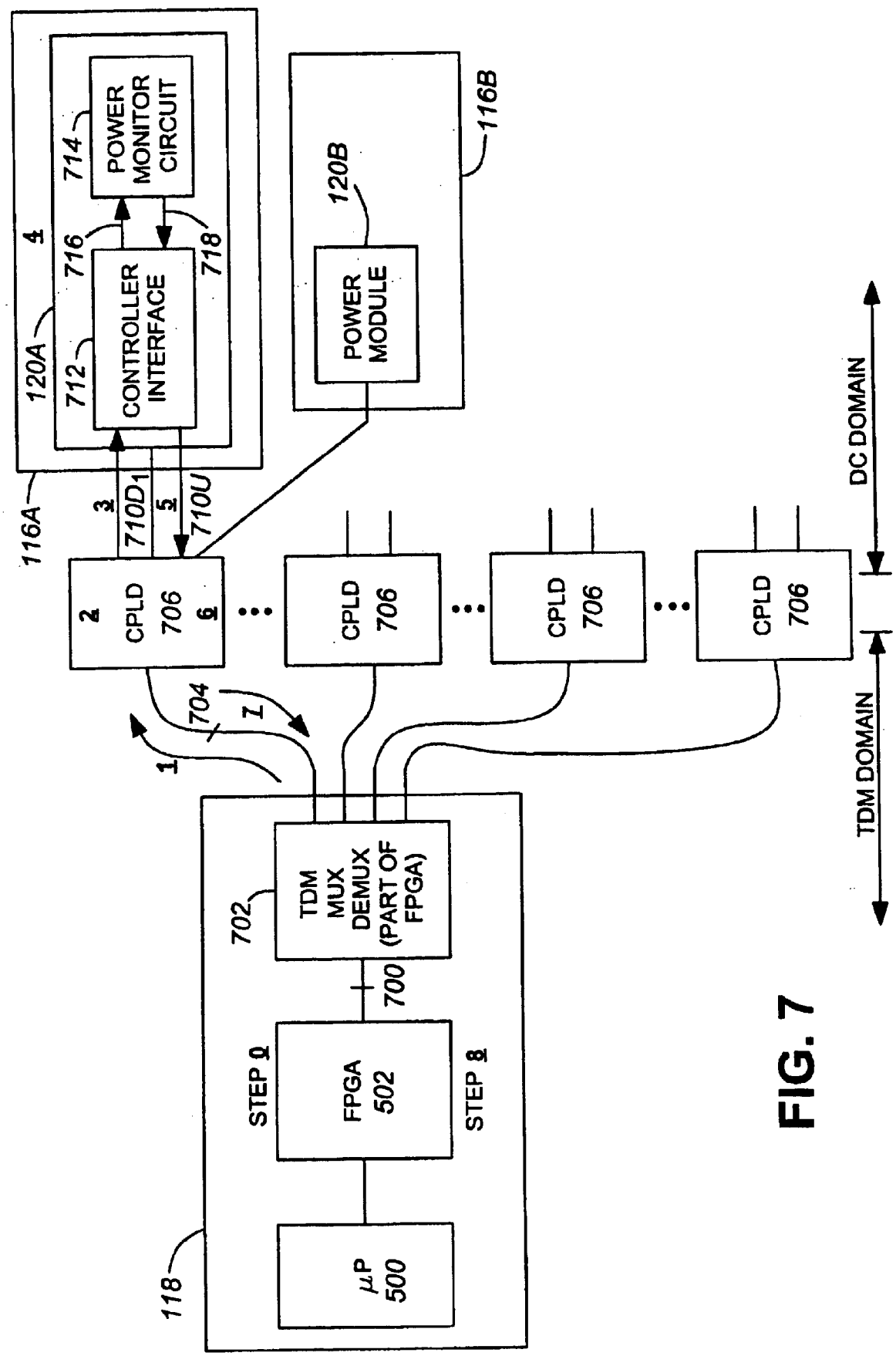
FIG. 7 is a block diagram illustrating the control of a power module in a subshelf by a shelf controller through a midplane interface module of the switch of FIG. 1.

Referring to FIG. 7, shelf controller 118 is shown. Therein, when shelf controller 118 communicates with power module 120A, which is contained within subshelf 116A, it is necessary to communicate via the communications protocol defined to send communications between shelf controller 118 and subshelf 116A. In the embodiment, the communications are provided via a TDM multiplexed datastream.

Within the multiplexed datastream, shelf controller 118 sends messages in the digital time domain to a plurality of shelves 116. Embedded within a particular TDM stream, a control message may be sent to power module 120A of subshelf 116A. Further, power module 120A may generate a response to the request and send it to shelf controller 118 via a corresponding reply TDM stream. For the sake of simplicity, the downstream TDM stream is shown in detail. The upstream TDM link from subshelf 116A to shelf controller 118 is shown; however the specific aspects of its TDM system are not illustrated.

The following example illustrates the transition of the signalling message from the shelf controller 118, through the TDM domain is converted, to the DC domain and finally is transmitted to power module 120A. The example also illustrates the generation of the responding message by power module 120A and the subsequent transmission of the response from subshelf 116A to shelf controller 118.

To begin for the communication system, shelf controller 118, in an exemplary signalling situation, requests that power module 120A turn on its local red error LED lamp when controller 118 cannot determine the identity of power module 120A. Accordingly, to generate the request an appropriate bit in FPGA 502 is set which causes FPGA 502 to generate a request encoded in an appropriate TDM message, destined for power module 120A, to turn on its red error LED lamp. This is step 0. The TDM message is provided along link 700 to TDM multiplexer 702. In step 1, TDM multiplexer 702 operates in a known multiplexing fashion and sends the request out on one TDM stream on link 704 to CPLD 706. CPLD is a processing module located on the midplane 114C of shelf 116.

The TDM stream in sent along 704 contains the request. CPLD 706 receives request in the TDM stream and converts it to an appropriate request encoded as a DC signal. This is shown at step 2. The DC signal is sent along downstream link 710D to power module 120A. In the embodiment the downstream link 710D is provided as a midplane connection. This is shown at step 3.

At step 4, the power module 120A receives the request at controller interface module 712. Controller interface module 712 acts upon it and sends a request to power monitor circuit 714 to turn on its red error LED lamp via link 716. Power monitor circuit initiates the request to turn on its red error LED lamp. Power monitor circuit generates a status signal that is sent to controller interface module 712 via link 718. Controller interface module 712 receives the signal and generates an appropriate upstream DC signal for transmission on link 710U.

Accordingly, at step 5, an upstream DC signal is provided to CPLD 706 along upstream link 710U. CPLD 706 receives the DC signal from power module 120 and converts it to a TDM domain signal. This is shown at step 6. This TDM signal is sent through upstream TDM link 704U. This is shown at step 7. The upstream TDM signal is received at TDM demultiplexer 702 and transmitted to FPGA 502 in a single stream. At step 8, the appropriate bit register is set in FPGA 502 extracted from the TDM datastream containing the upstream signal. Microprocessor 500 extracts the data from the appropriate register in FPGA 502 and analyzes the response to determine the status of power module 120. It will be seen that there are similarities between the analysis conducted by the FPGA 502 for responses received from fan unit 204A and responses received from power module 120A.

Figure 8:
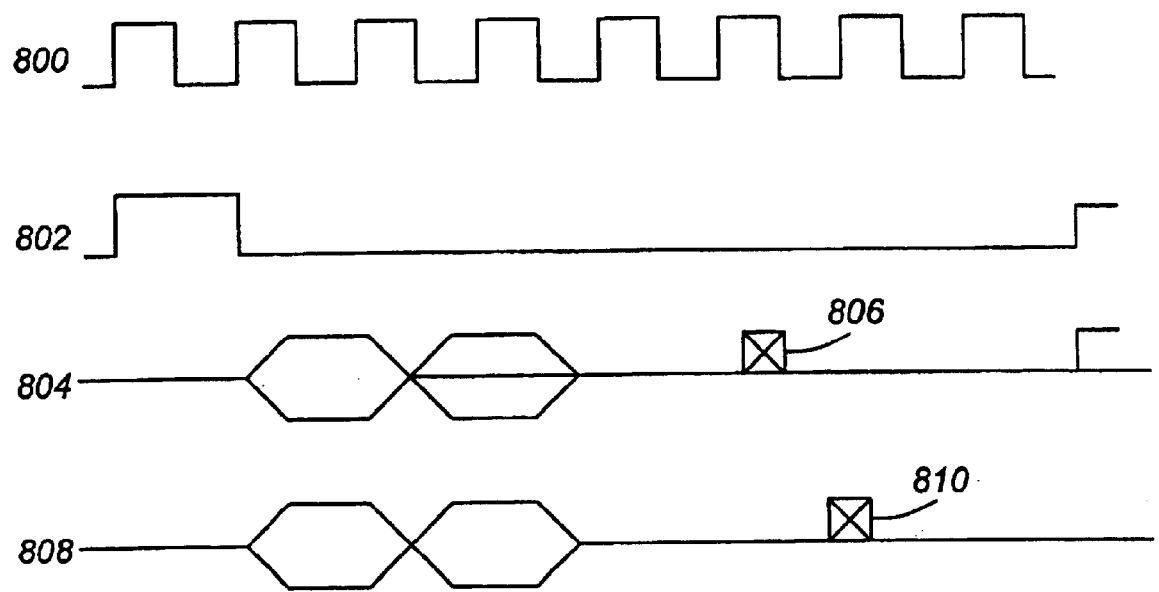
FIG. 8 is a diagram of signals sent by the shelf controller and generated by the midplane interface module as illustrated in FIG. 7.

For the monitoring system, FIG. 8 illustrates an exemplary set of signals sent by the shelf controller 118 in the TDM domain to the power module 120A and the subsequent TDM-encoded signal generated by the control interface 712 in power module 120A. Signal 800 represents a clocking signal for the TDM system. In the original signal, pulse 608 (FIG. 6) is provided by power module 120A. Signal 802 represents one frame pulse. Within a particular multiplexed stream destined for subshelf 116A, signal 804 illustrates a bit position 806 which indicates that "ping" bit, equivalent to the pulses 602 and 604 of FIG. 6. This signal 804 is provided along downstream link 704D to CPLD 706. At CPLD 706, the TDM signal is extracted and converted into an appropriate DC pulse signal, which may be akin to pulses 602 and 604 in signal 600 in FIG. 6. Similarly, the responding message generated by power module 120 may resemble either signal 608 or 614 depending on the state of operation of power module 120A. Assuming that signal 608 is generated, CPLD 706 then receives the DC pulse signal from power module 120A and converts it to an appropriate TDM stream such as TDM stream 808. Signal 608 is sampled at a sufficient sampling rate to ensure the generation of a plurality of samples which can be encoded in a plurality of successive TDM frames. Encoded within TDM stream 808 is bit position 810 which has the responding sampled "ping" value equivalent to either pulse pairs 610 and 612 for signal 608 for the given sampling period. Upon receipt and extraction of the digital information in signal 808, shelf controller 118 can then determine whether power module 120A whether the link is valid for the entire path from the shelf controller 118 to the CPLD 706 and to power module 120A, in both upstream and downstream directions.

It will be appreciated that other digital domain signalling systems known in the art may be used instead of a TDM system.

It will be appreciated that when embedding the monitoring system for the power module interface in the TDM stream, the pulse train provided in the upstream the TDM is inserted by sampling the DC signal in the upstream signal, then inserting its value into the upstream TDM stream. The sampling rate is the frame rate. Subsequently, the pulse train would be extracted and reconstructed at the controller. It will be appreciated that, the relationship between pulse width and sampling frequency must be respected. If it is not, then the sampled pulse train may not be adequately reconstructed, causing pulses to disappear, pulse width to be widened, or pulse width to be shortened. Each of these distortion may cause the monitoring system and the communication system to not operate properly. The embodiment utilizes a sufficient sampling frequency and a frequency/pulse width relationship to avoid such distortions.

It can also be seen that in both the TDM and DC signal domains, the presence of a superimposed "ping" signal on the status signal provided by either the fan unit 204 or the power module 120 to the shelf controller 118 indicates that the complete link is operation. In abnormal instances, the embodiment does not receive a discernible "ping" signal on the status signal.

Figure 9:
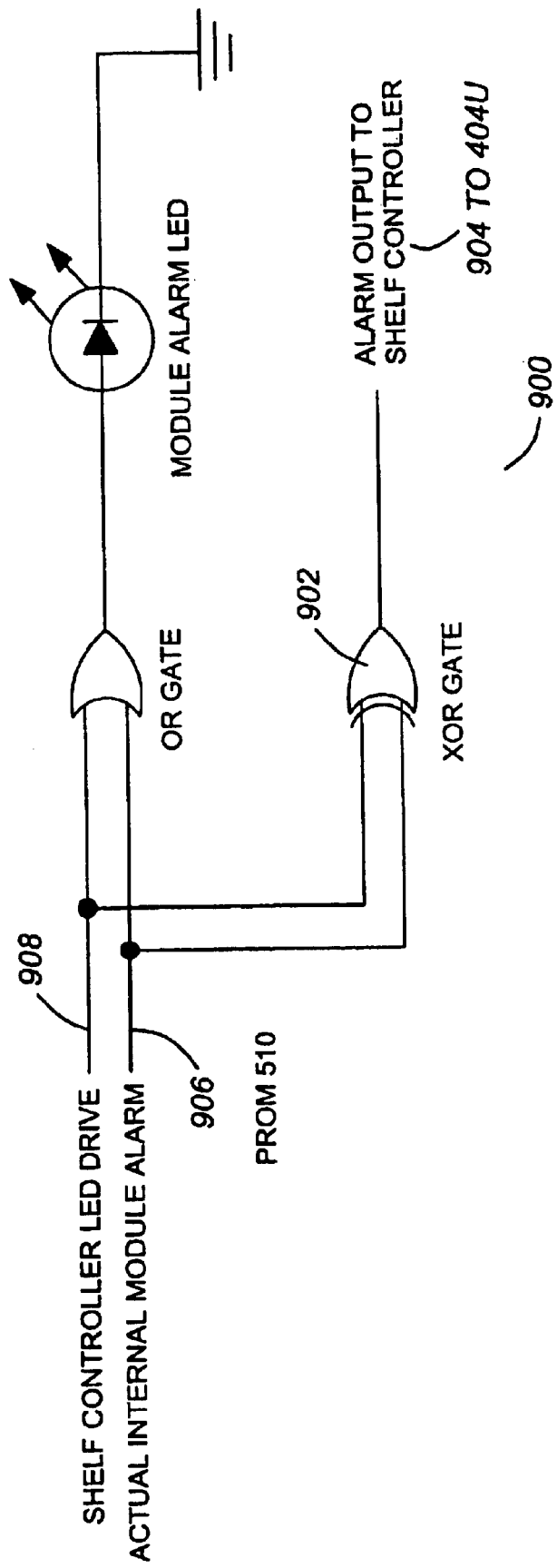
FIG. 9 is a block diagram of a message generator for the fan unit of FIG. 5.

Referring to FIG. 9, an exemplary circuit is shown which provides a circuit for power unit 120 which superimposes the "ping" signal on the status signal provided upstream to the shelf controller 118, following the functional description of the circuit described earlier. Essentially, in circuit 900, XOR gate 902 produces output signal 904 which is sent on link 404U for the power unit 120. Inputs to XOR gate 902 comprise internal status signal 906 provided by fan control circuit 506 to controller interface unit 504 via link 510 and LED drive signal 908 provided by the signal on FPGA 502 on link 404D. It will be appreciated that the signals may be isolated using optocouplers. It will be appreciated that a similar circuit would be functionally present for fan unit 204A.

It will further be appreciated that a similar communication and monitoring system can be implemented for components in the switching shelf related to core 110 of switch 100.

It will be appreciated from the above that the embodiment provides a simplified system which enables a remote controlling system to determine the integrity of a communications link for a system.

It is noted that those skilled in the art will appreciate that various modifications of detail may be made to the present embodiment, all of which would come within the scope of the invention.

We claim:

1. A signalling system providing communications between a controller and a remote unit in a network element, said signalling system comprising:

a first communication module associated with said controller, said first communication module adapted to generate a command signal and a downstream monitoring signal for said remote unit and adapted to receive a status signal and an upstream monitoring signal associated with said remote unit;

a second communication module associated with said remote unit, said second communication module adapted to receive said command signal and said downstream monitoring signal from first communication module and adapted to generate said status signal and said upstream monitoring signal;

a communication link associated with said first communication module and said second communication module, said communication link adapted to carry said command signal, said downstream monitoring signal, said status signal and said upstream monitoring signal, wherein said controller monitors for receipt of said upstream monitoring signal and said status signal by said first communication module and determines a status of at least said communication link and said remote unit from any signals received by said first communication module.

2. A signalling system as claimed in claim 1 wherein said downstream monitoring signal is carried with said command signal, and said upstream monitoring signal is carried with said status signal.

3. A signalling system as claimed in claim 2 wherein said command signal is a DC signal and said downstream monitoring signal is a pulse signal superimposed on said command signal said status signal is another DC signal; and said upstream monitoring signal is another pulse signal superimposed on said status signal, said status signal being discernible from said upstream monitoring signal by said first communication module.

4. A signalling system as claimed in claim 3 wherein said upstream monitoring signal is generated by said second communication module from an XOR function of a value of an internal state signal related to said status signal and a second value of said pulse signal of said downstream monitoring signal.

5. A signalling system as claimed in claim 4 wherein said remote unit is a fan unit.

6. A signalling system as claimed in claim 2 wherein said controller provides a TDM stream comprising a bitstream relating to said command signal and said downstream monitoring signal;

prior to transmission over said communication link, said TDM stream is converted to a DC signal and said downstream monitoring signal is converted to a pulse signal superimposed on said command signal;

said status signal is another DC signal provided to said communication link and said upstream monitoring signal is another pulse signal superimposed on said status signal; and after receiving said status signal and said upstream monitoring signal over said communication link, said controller converts said status signal and said upstream monitoring signal to another TDM stream which is analyzed by said controller to determine said status of at least said communication link and said remote unit.

7. A signalling system as claimed in claim 6 wherein said upstream monitoring signal is generated by said second communication module from an XOR function of a value of an internal state signal related to said status signal and a second value of said pulse signal of said downstream monitoring signal.

8. A signalling system as claimed in claim 7 wherein said remote unit is a power module.

9. A signalling system providing communications between a controller and a remote unit, said signalling system comprising:

a first communication module associated with said controller, said first communication module adapted to generate a command signal as a DC signal and a downstream monitoring signal superimposed on said command signal and adapted to receive a status signal and an upstream monitoring signal associated with said remote unit;

a second communication module associated with said remote unit, said second communication module adapted to receive said command signal and said downstream monitoring signal from said first communication module and adapted to generate said status signal and said upstream monitoring signal as a pulse for said controller utilizing said command signal, said downstream monitoring signal and a status of said remote unit;

a communication link associated with said first communication module and said second communication module, said communication link adapted to carry said command signal, said downstream monitoring signal, said status signal and said upstream monitoring signal, wherein said controller monitors for receipt of said upstream monitoring signal and said status signal by said first communicatin module and determines a status of at least said communication link and said remote unit by analyzing any signals received by said first communication module.

10. The signalling unit as claimed in claim 9 wherein said upstream monitoring signal is generated by said second communication module from an XOR function of a value of an internal state signal related to said status signal and a second value of a pulse signal related to said downstream monitoring signal.

11. The signalling system as claimed in claim 10 wherein said remote unit is a fan unit and said first and second communication modules are in a network element.

12. The signalling system as claimed in claim 9 wherein said controller further comprises a TDM module to generate a TDM stream containing a bitstream relating to said command signal and said downstream monitoring signal;

at said first communication module, said TDM stream is converted to said conunand signal and said downstream monitoring signal; and at said first communication module, said status signal and said upstream monitoring signal is converted to signals in another TDM stream and provided to said TDM module.

13. The signalling system as claimed in claim 12 wherein said upstream monitoring signal is generated by said second communication module from an XOR function of a value of an internal state signal related to said status signal and a second value of a pulse signal related to said downstream monitoring signal.

14. The signalling system as claimed in claim 12 wherein said remote unit is a power module.

15. A method for a controller remotely connected to a remote unit via a communication link to monitor a status of said communication link and said remote unit, said method comprising:

at said controller
generating a command signal as a DC signal and a downstream monitoring signal superimposed on said command signal for said remote unit; and
transmitting said command signal and said downstream signal to said remote unit via said communication link;

at said remote unit
monitoring for receipt of said command signal and said downstream monitoring signal;
upon receipt of said command signal and said monitoring signal, generating a status signal and an upstream monitoring signal as a pulse superimposed on said status signal based on said command signal, said downstream monitoring signal and a status of said remote unit; and transmitting said status signal and said upstream monitoring signal to said controller via said communication link;

and further at said controller
monitoring for receipt of said upstream monitoring signal and said status signal; and
determining a status of at least said communication link and said remote unit from any signals received from said remote unit.

16. The method for a controller remotely connected to a remote unit via a communication link to monitor a status of said communication link and said remote unit as claimed in claim 15 wherein said upstream monitoring signal is generated by said second communication module from an XOR function of a value of an internal state signal related to said status signal and a second value of a pulse signal related to said downstream monitoring signal.

17. The method for a controller remotely connected to a remote unit via a communication link to monitor a status of said communication link and said remote unit as claimed in claim 16 wherein said remote unit is a fan unit.

18. The method for a controller remotely connected to a remote unit via a communication link to monitor a status of said communication link and said remote unit as claimed in claim 15, wherein at said controller said command signal and said downstream monitoring signal are generated after receiving comparable command signals embedded in a TDM stream; and after said status signal and said upstream monitoring signal are received over said communication link, another TDM stream is generated containing a bitstream containing information relating to said status signal and said upstream monitoring signal and said status of at least said communication link and said remote unit from any signals received from said unit is determined from analyzing said another TDM stream.

* * * * *